(12) United States Patent
Fuchs et al.

(10) Patent No.: US 10,173,339 B2
(45) Date of Patent: Jan. 8, 2019

(54) MACHINE TOOL SEPARATING DEVICE (75) Inventors: Rudolf Fuchs, Neuhausen (DE); Petr Grulich, Kirchheim unter Teck (DE); Uwe Engelfried, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 1112 days.

(21) Appl. No.: 14/002,433

(22) PCT Filed: Mar. 2, 2012

(86) PCT No.: PCT/EP2012/000921
§ 371 (c)(1),
(2), (4) Date: Mar. 4, 2014

(87) PCT Pub. No.: WO2012/116832
PCT Pub. Date: Sep. 7, 2012

(65) Prior Publication Data
US 2014/0173918 A1   Jun. 26, 2014

(30) Foreign Application Priority Data
Mar. 3, 2011   (DE) .................... 10 2011 005 016

(51) Int. Cl.
*B27B 17/02*   (2006.01)
*B23D 57/02*   (2006.01)
*B27B 33/14*   (2006.01)

(52) U.S. Cl.
CPC ............ *B27B 17/02* (2013.01); *B23D 57/023* (2013.01); *B27B 17/025* (2013.01); *B27B 33/142* (2013.01)

(58) Field of Classification Search
CPC ....... B27B 33/14; B27B 17/02; B27B 17/025; B27B 33/142; B23D 57/023
USPC ................. 30/373, 374, 382, 122, 386, 387
See application file for complete search history.

(56) References Cited

U.S. PATENT DOCUMENTS 2,992,660 A   7/1961 Merz
3,092,156 A * 6/1963 Hayden ............... B27B 17/0083
                                              30/371
4,316,327 A * 2/1982 Scott ...................... B27B 17/14
                                              30/386
4,355,551 A   10/1982 Kolleas
(Continued)

FOREIGN PATENT DOCUMENTS

CN   101108493 A   1/2008
CN   201020755 Y   2/2008
(Continued)

OTHER PUBLICATIONS

International Search Report corresponding to PCT Application No. PCT/EP2012/000921, dated Jul. 9, 2012 (German and English language document) (7 pages).

*Primary Examiner* — Omar Flores Sanchez
(74) *Attorney, Agent, or Firm* — Maginot, Moore & Beck LLP (57) ABSTRACT

A machine tool separating device, in particular on a hand-held machine tool separating device, includes at least one cutting strand and at least one guide unit, which form a self-contained system. The guide unit comprises at least one main guide unit element and/or at least one cutting strand holding unit, wherein at least the main guide unit element and/or the cutting strand holding unit has at least two guide surfaces, which have different alignments in relation to one another and which, when mounted, are provided to guide the cutting strand.

20 Claims, 7 Drawing Sheets (56) References Cited

U.S. PATENT DOCUMENTS

| | | | |
|---|---|---|---|
| 4,382,334 | A | 5/1983 | Reynolds |
| 4,569,027 | A | 2/1986 | Nakano et al. |
| 4,726,274 | A * | 2/1988 | Pitoni .................. B23Q 9/0014 83/574 |
| 4,757,735 | A * | 7/1988 | Olson ................. B27B 17/0058 83/527 |
| 5,345,686 | A | 9/1994 | Zimmermann |
| 5,826,343 | A * | 10/1998 | Mollberg, Jr. ...... B27B 17/0083 30/371 |

FOREIGN PATENT DOCUMENTS

| | | |
|---|---|---|
| DE | 3446611 A1 | 7/1985 |
| DE | 42 19 956 A1 | 12/1993 |
| DE | 43 18 492 A1 | 12/1994 |
| DE | 195 36 840 A1 | 4/1997 |
| EP | 0 849 598 A1 | 6/1998 |
| SU | 406725 A1 | 11/1973 |

\* cited by examiner

MACHINE TOOL SEPARATING DEVICE

PRIOR ART

Machine tool separating devices which include a cutting strand and a guide unit which together form a closed system are already known.

DISCLOSURE OF THE INVENTION

The invention proceeds from a machine tool separating device, in particular from a hand-held machine tool separating device, having at least one cutting strand and having at least one guide unit which form a closed system.

It is proposed that the guide unit includes at least one guide unit main element and/or at least one cutting strand holding unit, wherein at least the guide unit main element and/or the cutting strand holding unit have at least two guide surfaces which have different alignments with respect to one another and which, in a mounted state, are provided for guiding the cutting strand. A "cutting strand" is to be understood, in this case in particular, as a unit which is provided for the purpose of locally removing an atomic cohesion of a workpiece to be processed, in particular by means of mechanical separation and/or by means of mechanical removal of particles of the material of the workpiece. In a preferred manner, the cutting strand is provided for the purpose of separating the workpiece into at least two parts which are physically separated from one another and/or for separating off and/or removing at least in part particles of the material of the workpiece proceeding from a surface of the workpiece.

In a particularly preferred manner, the cutting strand is realized as a cutting chain which is drivable in a circulating and/or oscillating manner along a periphery of the guide unit. The cutting strand consequently preferably includes cutting edge carrying elements which are realized as chain links. In this connection, the cutting edge carrying elements can be releasably connected together, such as, for example, by means of a chain joint etc., and/or non-releasably connected together. However, it is also conceivable for the cutting strand to be realized as a cutting belt and/or cutting cable. In the case of the cutting strand being realized as a cutting belt and/or as a cutting cable, the cutting edge carrying elements are fixed directly on the cutting belt and/or on the cutting cable and are drivable in a circulating and/or oscillating manner along a periphery of the guide unit.

A "guide unit" is to be understood, in this case in particular, as a unit which is provided for the purpose of exerting a positive force onto the cutting strand at least along a direction at right angles to a cutting direction of the cutting strand in order to provide a movement possibility of the cutting strand along the cutting direction. In a particularly preferred manner the guide unit is in two parts. In this context, "provided" is to be understood as specially designed and/or specially equipped. In a preferred manner, the guide unit has at least one guide element, in particular a guide groove, through which the cutting strand is guided. In a preferred manner, the cutting strand, when viewed in a cutting plane, is guided along an entire periphery of the guide unit by the guide unit by means of the guide element, in particular the guide groove. The term "cutting plane" is to define, in this case in particular, a plane in which the cutting strand is moved along a periphery of the guide unit in at least two cutting directions directed in opposite directions with respect to one another in relation to the guide unit. In a preferred manner, when a workpiece is being processed, the cutting plane is aligned at least substantially transversely with respect to a workpiece surface being processed. The term "at least substantially transversely" is to be understood, in this case in particular, as an alignment of a plane and/or of a direction in relation to a further plane and/or to a further direction which, in a preferred manner, deviates from a parallel alignment of the plane and/or of the direction in relation to the further plane and/or of the further direction. However, it is also conceivable for the cutting plane, when a workpiece is being processed, to be aligned at least substantially parallel to a workpiece surface being processed, in particular when the cutting strand is realized as grinding means etc. The term "at least substantially parallel" is to be understood, in this case in particular, as an alignment of a direction in relation to a reference direction, in particular in one plane, the direction having a deviation compared to the reference direction in particular smaller than 8°, in an advantageous manner smaller than 5° and in a particularly advantageous manner smaller than 2°.

A "cutting direction" is to be understood, in this case in particular, as a direction along which the cutting strand is moved for generating a clearance and/or for separating and/or for removing particles of material of a workpiece to be processed in at least one operating state as a result of a drive force and/or a drive moment, in particular in the guide unit. In a preferred manner, in an operating state the cutting strand is moved along the cutting direction in relation to the guide unit. In a preferred manner, the guide unit has a geometric development which, when viewed in the cutting plane, has an outside contour which is closed per se and includes at least two straight lines which extend parallel to one another and at least two connection portions, in particular arcs of a circle, which in each case connect facing ends of the straight lines to one another. The term "closed system" is to define, in this case in particular, a system which includes at least two components which, by means of interaction when the system is removed from a system which ranks higher than the system, such as, for example, a machine tool, maintain a functionality and/or are connected captively to one another in the removed state. In a preferred manner, the at least two components of the closed system are connected together in an at least substantially non-releasable manner for a user. The term "at least substantially non-releasable" is to be understood, in this case in particular, as a connection between at least two components which are only separable from one another with the aid of separating tools, such as, for example, a saw, in particular a mechanical saw etc., and/or chemical parting agents, such as, for example, solvents etc.

In a particularly preferred manner, the at least two guide faces are realized adjoining one another. In this connection the at least two guide faces are preferably arranged at least substantially at right angles to one another. The term "substantially at right angles" is to define, in this case in particular, an alignment of a direction in relation to a reference direction, the direction and the reference direction, when viewed in particular in one plane, enclosing an angle of 90° and the angle having a maximum deviation of in particular smaller that 8°, in an advantageous manner smaller than 5° and in a particularly advantageous manner smaller than 2°. In a particularly preferred manner, the guide faces are realized integrally with the guide unit main element. A "guide unit main element" is to be understood, in this case in particular, as an element of the guide unit which makes up at least a mass fraction of more than 20%, in a preferred manner more than 30% and in a particularly preferred manner more than 40% of an overall mass of the guide unit and/or the at least one volume fraction makes up more than 20%, in a preferred manner more than 30% and in a particularly preferred manner more than 40% of an overall volume of the guide unit. The term "integrally" is to be understood, in this case in particular, as being connected in an at least positively bonded manner, for example by means of a welding process, a bonding process, an injection process and/or another process which appears sensible to an expert, and/or as being advantageously molded in one piece, such as, for example, by means of production from a casting and/or by means of production using a single or multiple component injection molding method and in an advantageous manner from one single blank. In addition, the term "cutting strand holding unit" is to define a unit which holds the cutting strand at least substantially in a mounting position of the cutting strand on a drive side of the guide unit with the machine tool separating device, in particular the guide unit, removed from a coupling device of a portable machine tool. In particular, in the case of a machine tool separating device which is realized separately from a torque transmitting element arranged in the guide unit, the cutting strand is held in a mounting position of the cutting strand by means of the cutting strand holding unit on a drive side of the guide unit, with the machine tool separating device, in particular the guide unit, removed from the coupling device. A "drive side" is to be understood, in this case in particular, as a side of the guide unit, when viewed in the cutting plane of the cutting strand, on which a drive element of the portable machine tool is couplable with the cutting strand and in particular engages in the guide unit for transmitting drive forces and/or drive moments onto the cutting strand with the machine tool separating device, in particular the guide unit, connected to the coupling device. The term "mounting position" is to be understood, in this case in particular, as a position of the cutting strand, when arranged in the guide unit, in which, when the machine tool separating device, in particular the guide unit, is coupled with the coupling device, the cutting strand is directly connectable to the drive element of the portable machine tool. In a preferred manner, the drive element is insertable into the guide unit in the mounting position of the cutting strand whilst the cutting strand is couplable with the drive element by an operator uncoupled from a hold of the cutting strand. A compact design of the machine tool separating device can be realized in an advantageous manner by means of the development of the machine tool separating device as claimed in the invention. In addition, mounting steps for mounting the machine tool separating device can be reduced in an advantageous manner.

In addition, it is proposed that the guide unit includes at least one further guide unit main element which has at least two guide surfaces which have different alignments with respect to one another and which, in a mounted state, are provided for guiding the cutting strand. In a particularly preferred manner, the guide surfaces are realized integrally with the further guide unit main element. In a mounted state, the guide unit main element and the further guide unit main element preferably form a guide groove for receiving the cutting strand. The guide unit for guiding the cutting strand can be achieved in a structurally simple manner.

In an advantageous manner, the guide unit main element and the further guide unit main element in a mounted state are connected together by means of a positive-locking and/or friction-locking connection. However, it is also conceivable for the guide unit main element and the further guide unit main element to be connected together in a mounted state by means of a positive-bonding connection. In a particularly preferred manner, the guide unit main element and the further guide unit main element are connected together releasably in a mounted state in the cutting plane of the cutting strand. The guide unit main element and the further guide unit main element are preferably formed from ceramic. However, it is also conceivable for the guide unit main element and the further guide unit main element to be formed from another material which appears sensible to an expert. In a particularly preferred manner the guide unit is formed by means of mounting the guide unit main element and the further guide unit main element. The guide unit consequently includes only two components for fulfilling its function, apart from the number of components of the guide unit in this connection, connecting elements are necessary for connecting the guide unit main element and the further guide unit main element. A two-part development of the guide unit can be achieved in a structurally simple manner.

In addition, it is proposed that the guide unit, when viewed in a cutting plane of the cutting strand, has at least two convexly realized ends. The term "convexly realized" is to be understood, in this case in particular, as a geometric development of the connecting portions of the outside contour of the guide unit, which, proceeding from the guide unit, is arched outward. In a preferred manner, the connecting portions, in this connection, have a radius which proceeds from a center point which is arranged in a side face of the guide unit which extends in the cutting plane. Guiding the cutting strand when the cutting strand moves along a periphery of the guide unit can be achieved in a structurally simple manner. In an alternative development it is conceivable for the guide unit to have a rotatably mounted guide element, such as, for example, a roller, a toothed wheel, etc., on each of the connecting portions. When moving along a periphery of the guide unit, the cutting strand can consequently be guided in an advantageously low-friction manner by means of the rotatably mounted guide elements.

In addition, it is proposed that the cutting strand holding unit is arranged at least in part on the guide unit main element. In a preferred manner, the cutting strand holding unit is arranged in the region of the drive side on the guide unit main element. In a preferred manner in this connection, the cutting strand holding unit is arranged on the guide unit main element by means of a friction-locking and/or by means of a positive-bonding connection, such as, for example, by means of a screw-type connection, a weld connection, a solder connection and/or a bonding connection etc. However, it is also conceivable for the cutting strand holding unit to be arranged on the guide unit main element by means of another type of connection which seems sensible to an expert, such as, for example, by means of a positive-locking connection. A compact machine tool separating device can be realized in a structurally simple manner by means of the development as claimed in the invention.

In an advantageous manner, the cutting strand holding unit includes at least one disc-shaped cutting strand holding element which is provided for the purpose of holding the cutting strand in at least one position, in particular the mounting position. The term "disc-shaped" is to be understood, in this case in particular, as a geometric development of an element which has an extension, in particular a thickness or a height, along at least one first direction which is smaller by a multiple than a further extension of the element, in particular a width or a diameter, along a further direction which extends at least substantially parallel to the first direction. However, it is also conceivable for the cutting strand holding element to have another development which appears sensible to an expert. In a preferred manner, the cutting strand holding element is provided for the purpose of holding the cutting strand by means of a positive-locking connection, in particular by means of a face of the cutting strand holding element, in at least one position, in particular the mounting position. However, it is also conceivable for the cutting strand holding element to hold the cutting strand in at least one position by means of another means which appears sensible to an expert, such as, for example, by means of a magnetic force, etc. In this connection, the cutting strand holding element can be realized integrally with a machine tool coupling element of the cutting strand holding element or the cutting strand holding element can be realized separately from the machine tool coupling element. In a particularly preferred manner, the cutting strand holding unit includes at least two disc-shaped cutting strand holding elements. In this connection, the two cutting strand holding elements are preferably arranged in each case in one of two planes arranged parallel to the cutting plane of the cutting strand and offset at least substantially parallel to one another. In an advantageous manner, the cutting strand can be prevented from falling into a coupling recess of the guide unit. As a result, a simple and convenient mounting of the machine tool separating device, in particular the guide unit, on the coupling device can be ensured in an advantageous manner, it being possible, in an advantageous manner, to avoid the operator holding the cutting strand for coupling the drive element with the cutting strand.

Furthermore, it is proposed that the cutting strand holding element has at least one drive element coupling recess. In a particularly preferred manner, the drive element coupling recess is oval. However, it is also conceivable for the drive element coupling recess to have another development which appears sensible to an expert, such as, for example, a circular development, a development as an elongated hole, etc. By means of the development as claimed in the invention, convenient insertion of the drive element of the portable machine tool is achieved in an advantageous manner with the machine tool separating device, in particular the guide unit, coupled with the coupling device of the portable machine tool, the cutting strand being held in an advantageous manner in the mounting position by means of the cutting strand holding element.

In a particularly advantageous manner, the cutting strand holding unit has at least one cutting strand holding element and at least one machine tool coupling element which is realized integrally with the cutting strand holding element. A "machine tool coupling element" is to be understood, in this case in particular, as an element which is provided for coupling the machine tool separating device, in particular the guide unit, with the portable machine tool. In a preferred manner, the machine tool coupling element is provided for the purpose of realizing a positive-locking and/or a friction-locking connection between the machine tool separating device and the portable machine tool for an operation of the machine tool separating device, in particular for driving the cutting strand by means of a drive element of the portable machine tool. In this connection, the machine tool coupling element is preferably inserted into a receiving region of the coupling device which is realized corresponding to the machine tool coupling element. However, it is also conceivable for the machine tool coupling element to be able to be arranged on the coupling device in another manner which seems sensible to an expert for coupling the machine tool separating device, in particular the guide unit, with the portable machine tool. By developing the machine tool coupling element and the cutting strand holding element in an integral manner, a compact development of the cutting stand holding unit can be achieved in an advantageous manner. Furthermore, installation space, costs and mounting expenditure are able to be reduced in an advantageous manner.

In addition, it is proposed that the cutting strand holding unit includes at least the cutting strand holding element which, when viewed along a direction which extends at least substantially at right angles to the cutting plane of the cutting strand, is arranged between at least two machine tool coupling elements of the cutting strand holding unit. As a result, with the machine tool separating device, in particular the guide unit, removed from the portable machine tool, the cutting strand can be prevented in a structurally simple manner from falling into a coupling recess of the guide unit.

The cutting strand preferably includes at least two interconnected cutting edge carrying elements which are connected together by means of at least one connecting element of the cutting strand which closes off at least substantially flush with at least one outside surface of one of the at least two cutting edge carrying elements. A "cutting edge carrying element" is to be understood, in this case in particular, as an element on which at least one cutting element is fixed for separating off and/or for removing particles of the material of a workpiece to be processed. The term "connecting element" is to define, in this case in particular, an element which is provided for the purpose of connecting at least two components together, in particular connecting together so as to be movable, in a positive-locking and/or friction-locking manner, in order to transmit a drive force and/or a drive moment. In a preferred manner, the connecting element is realized in a bolt-shaped manner. In a particularly preferred manner, the connecting element is realized integrally with a cutting edge carrying element. Consequently, the cutting edge carrying elements, in a particularly preferred manner, in each case have a connecting element and a connecting recess for receiving a connecting element of a further cutting edge carrying element which is connectable to the respective cutting edge carrying element. However, it is also conceivable for the cutting edge carrying elements to have in each case two connecting recesses into each of which a connecting element is insertable. The term "closes off in an at least substantially flush manner" is to be understood, in this case in particular, as an arrangement of the connecting element in a mounted state, the connecting element in a mounted state, when viewed along a longitudinal axis of the connecting element, extending inside the at least one connecting recess which receives the connecting element and extending as far as up to a maximum of an outside face of the cutting edge carrying element which has the connecting recess. A compact development of the machine tool separating device can be achieved in an advantageous manner.

Furthermore, it is proposed that the connecting element is guided at least in part by means of a guide element of the guide unit. In this connection, the connecting element, in a mounted state, is arranged in a preferred manner in a guide groove of the guide unit. Securement of the connecting element in the connecting recess in the case of a connection between the cutting edge carrying elements can be achieved in a structurally simple manner.

In an advantageous manner, the machine tool separating device has a torque transmitting element which is mounted, in particular movably mounted, at least in part in the guide unit. In a preferred manner, the torque transmitting element has a concentric recess into which a pinion of a drive unit of a portable machine tool and/or a gear wheel and/or a toothed shaft of a gearing unit of the portable machine tool is able to engage in a mounted state. In a preferred manner in this connection, the recess is formed by a hexagon socket. However, it is also conceivable for the recess to have another development which appears sensible to an expert. By means of the development of the machine tool separating device as claimed in the invention, a closed system which is mountable in a convenient manner by an operator on a machine tool provided for this purpose can be achieved in structurally simple manner. Consequently, it is possible to avoid individual mounting of components, such as, for example, the cutting strand, the guide unit and the torque transmitting element by the operator for using the machine tool separating device as claimed in the invention.

In addition, it is proposed that the guide unit, when viewed along a cutting direction of the cutting strand, has a cross section which changes at least in a part region of the guide unit in a direction at least substantially at right angles to a cutting plane of the cutting strand. The term "cross section" is to define, in this case in particular, a dimension such as, for example, a length or a section, etc. and/or an area of a component, in particular viewed in a section which extends at right angles to the cutting plane through the component. A high degree of sturdiness of the guide unit can be achieved in an advantageous manner.

The invention additionally proceeds from the portable machine tool having the coupling device for positive-locking and/or friction-locking coupling with the machine tool separating device as claimed in the invention. A "portable machine tool" is to be understood, in this case in particular, as a machine tool, in particular a hand-held machine tool, which is able to be transported by an operator without any transporting machines. The weight of the portable machine tool is in particular less than 40 kg, in a preferred manner less than 10 kg and in a particular preferred manner less than 5 kg. In a particularly preferred manner, the machine tool separating device as claimed in the invention and the portable machine tool as claimed in the invention form a machine tool system. A high level of operating convenience can be achieved in an advantageous manner for an operator, in particular when a tool is changed. Furthermore, a wide spectrum of use can be covered in an advantageous manner using the machine tool system as claimed in the invention.

The machine tool separating device as claimed in the invention and/or the portable machine tool as claimed in the invention are not to be restricted in this connection to the above-described application and embodiment. In particular, the machine tool separating device as claimed in the invention and/or the portable machine tool as claimed in the invention can have a number of individual elements, components and units which deviates from a number named herein for fulfilling a method of operation described herein.

DRAWING

Further advantages are produced from the following description of the drawing. Exemplary embodiments of the invention are shown in the drawing. The drawing, the description and the claims include numerous features in combination. The expert will also consider the features individually in an expedient manner and combine them to form sensible further combinations.

The drawing, in which.

DESCRIPTION OF THE EXEMPLARY EMBODIMENTS

Figure 1:
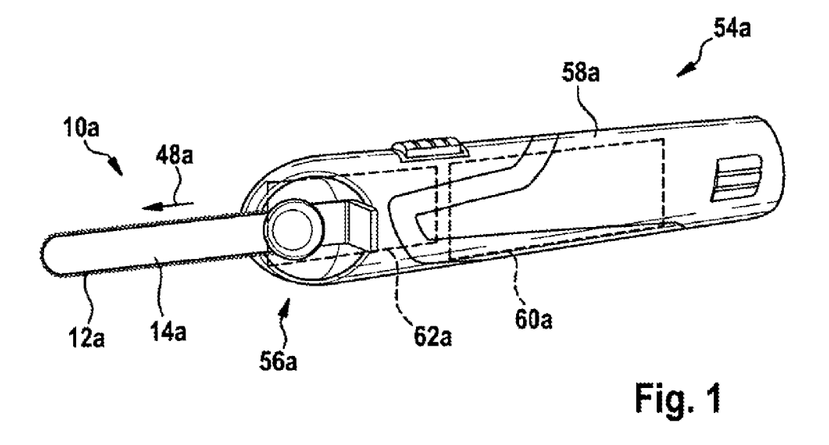
FIG. 1 shows a schematic representation of a portable machine tool as claimed in the invention with a machine tool separating device as claimed in the invention.

FIG. 1 shows a portable machine tool 54a with a machine tool separating device 10a which together form a machine tool system. The portable machine tool 54a has a coupling device 56a for positive-locking and/or friction-locking coupling with the machine tool separating device 10a. The coupling device 56a, in this connection, can be realized as a bayonet closure and/or as another coupling device which appears sensible to an expert. In addition, the portable machine tool 54a has a machine tool housing 58a which encloses a drive unit 60a and a gear unit 62a of the portable machine tool 54a. The drive unit 60a and the gear unit 62a are connected together operatively in a manner already known to an expert for generating a drive moment which is transmittable to the machine tool separating device 10a. The gear unit 62a is realized as miter gearing. The drive unit 60a is realized as an electric motor. However, it is also conceivable for the drive unit 60a and/or the gear unit 62a to have another development which appears sensible to an expert. The drive unit 60a is provided for the purpose of driving a cutting strand 12a of the machine tool separating device 10a in at least one operating state at a cutting speed of less than 6 m/s. In this connection, the portable machine tool 54a has at least one operating mode in which it is possible to drive the cutting strand 12a in a guide unit 14a of the machine tool separating device 10a along a cutting direction 48a of the cutting strand 12a at a cutting speed of less than 6 m/s.

Figure 2:
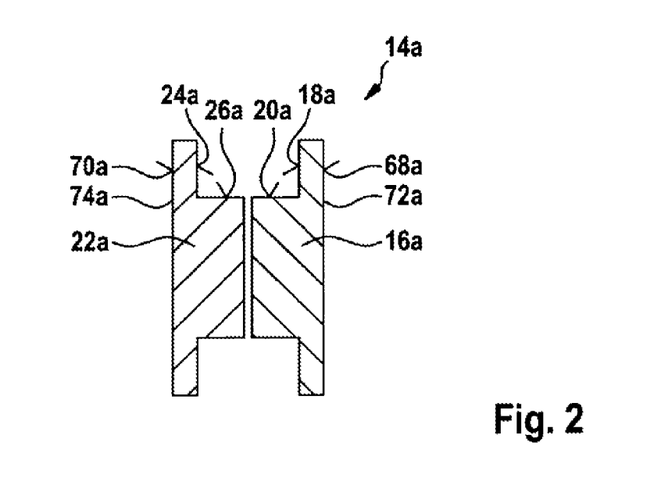
FIG. 2 shows a schematic representation of a sectioned view of a guide unit of the machine tool separating device as claimed in the invention.

FIG. 2 shows a sectioned view of the guide unit 14a in a non-mounted state. The guide unit 14a includes a guide unit main element 16a which has two guide surfaces 18a, 20a which have different alignments with respect to one another and which, with the guide unit 14a mounted, are provided for guiding the cutting strand 12a which is arranged in the guide unit 14a. The guide surfaces 18a, 20a are realized adjoining one another. In this connection, the guide surfaces 18a, 20a are arranged at least substantially at right angles to one another. One of the guide surfaces 18a, 20a extends at least substantially parallel to an outside face 68a of an outside wall 72a of the guide unit main element 16a. The guide surface 18a which extends parallel to the outside face 68a of the outside wall 72a is composed of two rectangular faces and two semi-circular faces which are arranged adjoining one another along a periphery of the guide unit main element 16a and have a development which is closed per se. Consequently, the guide surface 18a which runs parallel to the outside face 68a of the outside wall 72a extends along the entire periphery of the guide unit main element 16a, when viewed along a circumferential direction which extends in a mounted state in a cutting plane of the cutting strand 12a. In addition, one of the guide surfaces 18a, 20a extends at least substantially at right angles to the outside face 68a of the outside wall 72a. The guide face 20a which runs at right angles to the outside face 68a of the outside wall 72a extends at least substantially along the entire periphery of the guide unit main element 16a. In this connection, a recess (not shown here in any detail) is provided in the guide face 20a, which runs at right angles to the outside face 68a of the outside wall 72a, in the region of a torque transmitting element 46a of the machine tool separating device 10a (FIG. 3) which is arranged in the guide unit 14a. As a result, an engagement of the torque transmitting element 46a into the cutting strand 12a with the cutting strand 12a arranged in the guide unit 14a is realized.

Furthermore, the guide unit 14a has a further guide unit main element 22a which has two further guide faces 24a, 26a which have different alignments with respect to one another and which, with the guide unit 14a mounted, are provided for guiding the cutting strand 12a which is arranged in the guide unit 14a. In addition, it is conceivable for the guide unit 14c, additionally to the guide unit main element 16a and the further guide unit main element 22a, to have a cutting strand holding unit (not shown here in any detail) which has at least two guide faces which have different alignments with respect to one another and which are provided in a mounted state for guiding the cutting strand 12a. The further guide faces 24a, 26a of the further guide unit main element 22a have on the further guide unit main element 22a an arrangement which is analogous to an arrangement of the guide faces 18a, 20a on the guide unit main element 16a. In addition, the further guide faces 24a, 26a of the further guide unit main element 22a have a development which is analogous to the guide faces 18a, 20 of the guide unit main element 16a. The guide unit main element 16a and the further guide unit main element 22a are connected together in a mounted state in the cutting plane of the cutting strand 12a so as to be releasable by means of a positive-locking and/or a friction-locking connection. In this connection, the guide unit main element 16a and the further guide unit main element 22a, in a mounted state, form a guide element 44a of the guide unit 14a for guiding the cutting strand 12a. The guide unit main element 16a and the further guide unit main element 22a are realized in each case in a T-shaped manner.

Figure 3:
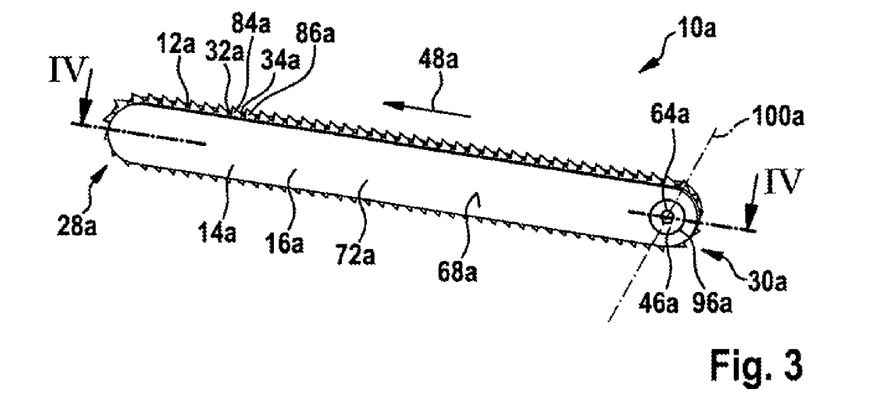
FIG. 3 shows a schematic representation of a view of a detail of the machine tool separating device as claimed in the invention.

FIG. 3 shows the machine tool separating device 10a in a state uncoupled from the coupling device 56a of the portable machine tool 54a. The machine tool separating device 10a has the cutting strand 12a and the guide unit 14a which together form a closed system. The guide unit 14a is realized as a sword. In addition, the guide unit 14a, when viewed in the cutting plane of the cutting strand 12a, has at least two convexly realized ends 28a, 30a. The convexly realized ends 28a, 30a of the guide unit 14a are arranged on two sides of the guide unit 14a remote from one another. The cutting strand 12a is guided by means of the guide unit 14a. To this end, the guide unit 14a has at least the guide element 44a (FIGS. 2 and 7) by means of which the cutting strand 12a is guided. The guide element 44a is realized as a guide groove 66a (FIGS. 2 and 7) which extends in the cutting plane of the cutting strand 12a along an entire periphery of the guide unit 14a.

Figure 7:
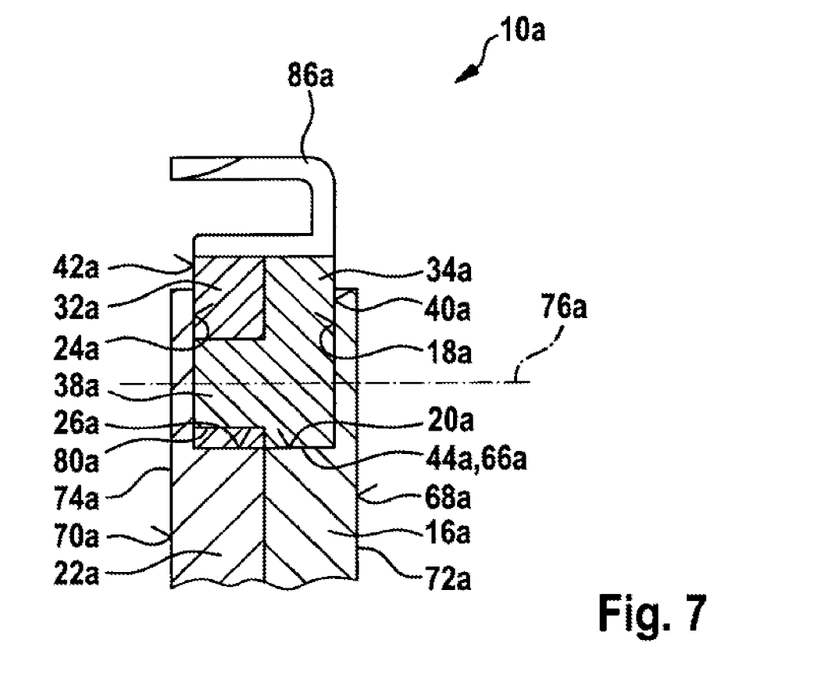
FIG. 7 shows a schematic representation of a view of a detail of an arrangement of the cutting edge carrying elements in a guide unit of the machine tool separating device as claimed in the invention.

The cutting strand 12a is guided by means of edge regions of the guide unit 14a which define the guide groove 66a. In this connection, the edge regions defining the guide groove 66a are formed by the guide faces 18a, 20a of the guide unit main element 16a and by the further guide faces 24a, 26a of the further guide unit main element 22a (FIG. 2). However, it is also conceivable for the guide element 44a to be realized in another manner which seems sensible to an expert, such as, for example, rib-like molding on the guide unit 14a which engages in a recess on the cutting strand 12a. The cutting strand 12a, when viewed in a plane which extends at right angles to the cutting plane, is surrounded on three sides by the guide faces 18a, 20a and the further guide faced 24a, 26a (FIGS. 2 and 7). During operation the cutting strand 12a is moved in a circulating manner along the periphery in the guide groove 66a in relation to the guide unit 14a.

Figure 5:
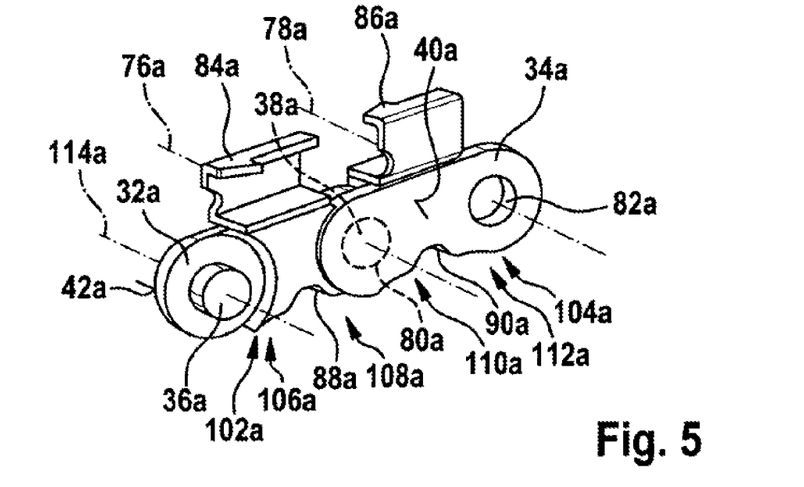
FIG. 5 shows a schematic representation of a view of a detail of cutting edge carrying elements of the machine tool separating device as claimed in the invention.
Figure 6:
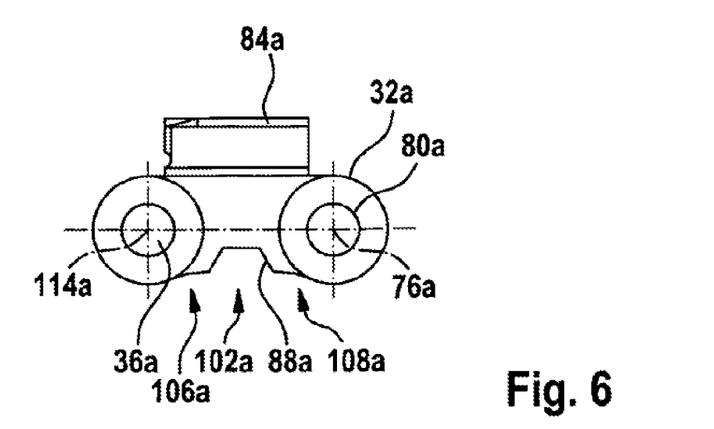
FIG. 6 shows a schematic representation of a further view of a detail of one of the cutting edge carrying elements of the cutting strand of the machine tool separating device as claimed in the invention.

The cutting strand 12a includes a plurality of interconnected cutting edge carrying elements 32a, 34a which, in each case, are connected together by means of at least one connecting element 36a, 38a of the cutting strand 12a, said connecting element closing off in an at least substantially flush manner with at least one of two outside faces 40a, 42a of the interconnecting cutting edge carrying element 32a, 34a (FIGS. 5 and 6). The connecting elements 36a, 38a are realized in a bolt-shaped manner. The outside faces 40a, 42a, with the cutting strand 12a arranged in the guide groove 66a, run at least substantially parallel to the cutting plane. An expert will select a number of cutting edge carrying elements 32a, 34a suitable for the cutting strand 12a in dependence on the application.

The cutting edge carrying elements 32a, 34a are realized in each case integrally with one of the connecting elements 36a, 38a. In addition, the cutting edge carrying elements 32a, 34a each have a connecting recess 80a, 82a for receiving one of the connecting elements 36a, 38a of the interconnected cutting edge carrying elements 32a, 34a. The connecting elements 36a, 38a are guided by means of the guide unit 14a (FIG. 7). In this connection, the connecting elements 36a, 38a, with the cutting strand 12a mounted, are arranged in the guide groove 66a. The connecting elements 36a, 38a, when viewed in a plane extending at right angles to the cutting plane, can be supported on the guide face 18a, which runs at least substantially parallel to the outside face 68a, and on the further guide face 24a, which runs at least substantially parallel to an outside face 70a of the further guide unit main element 22a.

In addition, the cutting strand 12a has a plurality of cutting elements 84a, 86a. A number of cutting elements 84a, 86a is dependent on a number of cutting edge carrying elements 32a, 34a. An expert will select a suitable number of cutting elements 84a, 86a in dependence on the number of cutting edge carrying elements 32a, 34a. The cutting elements 84a, 86a are realized in each case integrally with one of the cutting edge carrying elements 32a, 34a. In addition, the cutting elements 84a, 86a extend beyond the guide groove 66a in the cutting plane in order to make it possible to separate off and/or to remove particles of the material of a workpiece to be processed (not shown here in detail). The cutting elements 84a, 86a can be realized, for example, as full chisel tools, half chisel tools or other types of cutting edges which appear sensible to an expert and are provided for the purpose of making it possible to separate off and/or to remove particles of the material of a workpiece to be processed. The cutting strand 12a is realized in an endless manner. Consequently, the cutting strand 12a is realized as a cutting chain. The cutting edge carrying elements 32a, 34a, in this connection, are realized as chain links which are connected together by means of the bolt-shaped connecting elements 36a, 38a.

Figure 4:
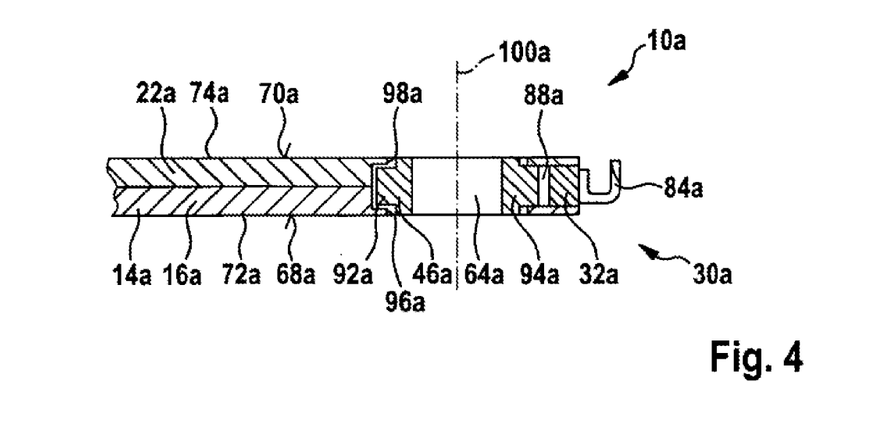
FIG. 4 shows a schematic representation of a sectioned view along the line IV-IV from FIG. 3 of the machine tool separating device as claimed in the invention.

For driving the cutting strand 12a, the machine tool separating device 10a has the torque transmitting element 46a which is connectable to the drive unit 60a and/or the gearing unit 62a for transmitting forces and/or torques to the cutting strand 12a. To this end, the torque transmitting element 46a has a coupling recess 64a into which a pinion of the drive unit 60a and/or a toothed wheel and/or a toothed shaft of the gearing unit 62a engages in the mounted state. The coupling recess 64a is arranged concentrically in the torque transmitting element 46a. In addition, the torque transmitting element 46a is realized as a toothed wheel. The torque transmitting element 46a is mounted at least in part in the guide unit 14a. In this connection, the torque transmitting element 46a, when viewed along a direction at right angles to the cutting plane, is arranged at least in part between the outside wall 72a of the guide unit main element 16a and the outside wall 74a of the further guide unit main element 22a (FIG. 4).

The torque transmitting element 46a is arranged with a part region in a recess 96a of the outside wall 72a of the guide unit main element 16a and in a recess 98a of the outside wall 74a of the further guide unit main element 22a. The torque transmitting element 46a, in this connection, at least in the part region arranged in the recesses 96a, 98a, has an extension along an axis of rotation 100a of the torque transmitting element 46a which closes off in a flush manner with the outside face 68a of the guide unit main element 16a and/or the outside face 70a of the further guide unit main element 22a. In addition, the part region of the torque transmitting element 46a arranged in the recesses 96a, 98a has an outside dimension which extends at least substantially at right angles to the axis of rotation 100a of the torque transmitting element 46a and is at least 0.1 mm smaller than an inside dimension of the recesses 96a, 98a which extends at least substantially at right angles to the axis of rotation 100a of the torque transmitting element 46a. The part region of the torque transmitting element 46a arranged in the recesses 96a, 98a is arranged along a direction which runs at right angles to the axis of rotation 100a in each case at a spacing to an edge of the outside wall 72a of the guide unit main element 16a which defines the respective recess 96a, 98a and the outside wall 74a of the further guide unit main element 22a. Consequently, the part region of the torque transmitting element 46a arranged in the recesses 96a, 98a has a clearance inside the recesses 96a, 98a.

The cutting edge carrying elements 32a, 34a of the cutting strand 12a each have a drive recess 88a, 90a which in each case, in a mounted state, is arranged on a side 102a, 104a of the respective cutting edge carrying element 32a, 34a facing the torque transmitting element 46a. The torque transmitting element 46a engages in the drive recesses 88a, 90a in at least one operating state to drive the cutting strand 12a. The torque transmitting element 46a includes teeth 92a, 94a which are provided for the purpose of engaging in the drive recess 88a, 90a of the cutting edge carrying elements 32a, 34a in at least one operating state to drive the cutting strand 12a. In addition, the sides 102a, 104a of the cutting edge carrying elements 32a, 34a facing the torque transmitting element 46a are realized in a circular manner. The sides 102a, 104a of the cutting edge carrying elements 32a, 34a facing the torque transmitting element 46a in a mounted state, when viewed between a center axis 114a of the respective connecting element 36a, 38a and a center axis 76a, 78a of the respective connecting element 80a, 82a, are in each case realized in a circular manner in part regions 106a, 108a, 110a, 112a. The circular part regions 106a, 108a, 110a, 112a are in each case realized adjoining the drive recesses 88a, 90a into which the torque transmitting element 46a engages. In this connection, the circular part regions 106a, 108a, 110a, 112a have a radius which corresponds to a radius of a development of the guide groove 66a on the convex ends 28a, 30a. The part regions 106a, 108a, 110a, 112a are realized in a concave manner (FIG. 6).

FIGS. 8 to 12 show alternative exemplary embodiments. Substantially identical components, features and functions are in principle numbered with the identical references. To differentiate between the exemplary embodiments, the letters a to c are added to the references of the exemplary embodiments. The following description is restricted essentially to the differences to the first exemplary embodiment in FIGS. 1 to 7, it being possible to refer to the description of the first exemplary embodiment in FIGS. 1 to 7 with reference to components, features and functions which remain the same.

Figure 8:
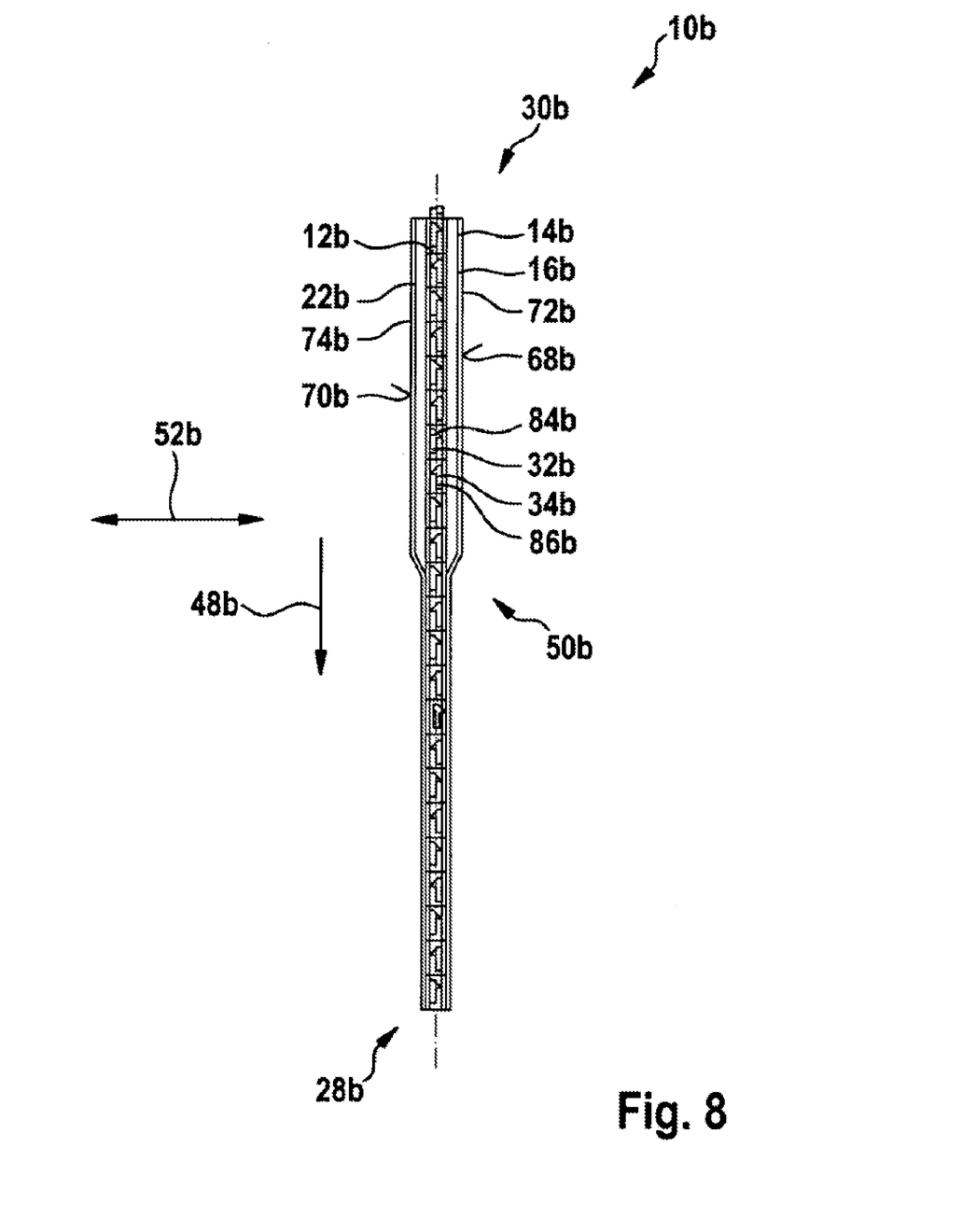
FIG. 8 shows a schematic representation of an alternative development of a machine tool separating device as claimed in the invention.

FIG. 8 shows an alternative machine tool separating device 10b when uncoupled from a coupling device of a portable machine tool (not shown here in any detail). The portable machine tool and the coupling device are designed in an analogous manner to the exemplary embodiment which has been described in FIGS. 1 to 7. The machine tool separating device 10b has a cutting strand 12b and a guide unit 14b. The guide unit 14b includes a guide unit main element 16b and a further guide unit main element 22b which, in a mounted state, are releasably connected together along a cutting plane of the cutting strand 12b by means of a positive-locking and/or friction-locking connection. In addition, the guide unit 14b, when viewed along a cutting direction 48b of the cutting strand 12b, has a cross section which changes at least in a part region of the guide unit 14b in a direction 52b at least substantially at right angles to the cutting plane of the cutting strand 12b. The guide unit 14b, when viewed along the cutting direction 48b, has a tapering in a transition region 50b. However, it is also conceivable for the guide groove 14b to have a sudden change in cross section.

Figure 9:
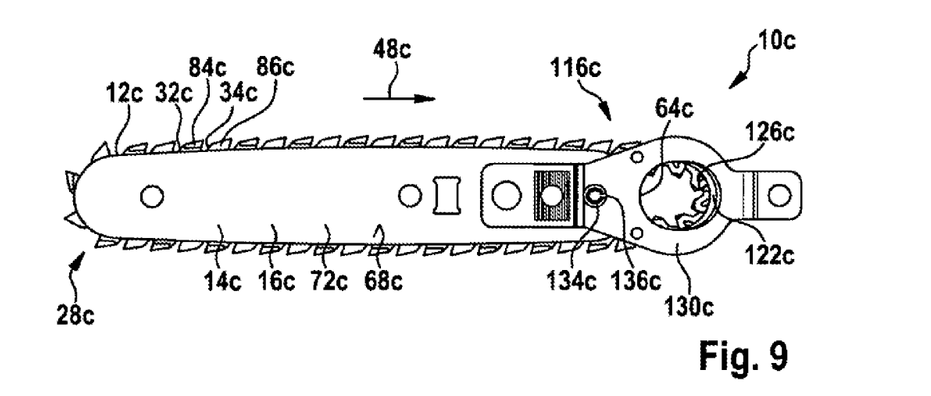
FIG. 9 shows a schematic representation of a view of a detail of a further alternative machine tool separating device as claimed in the invention.
Figure 10:
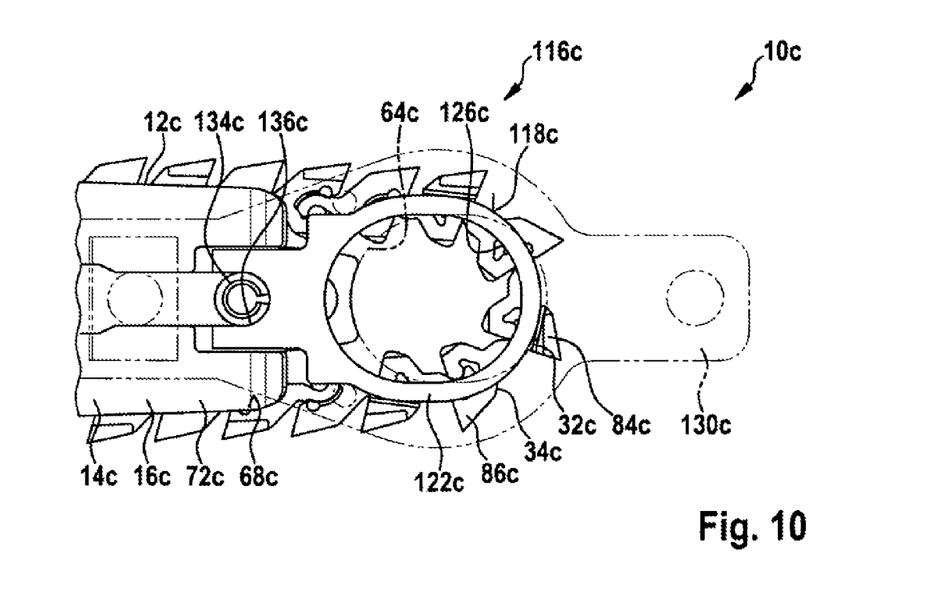
FIG. 10 shows a schematic representation of a view of a detail of a cutting strand holding unit of the further alternative machine tool separating device.
Figure 11:
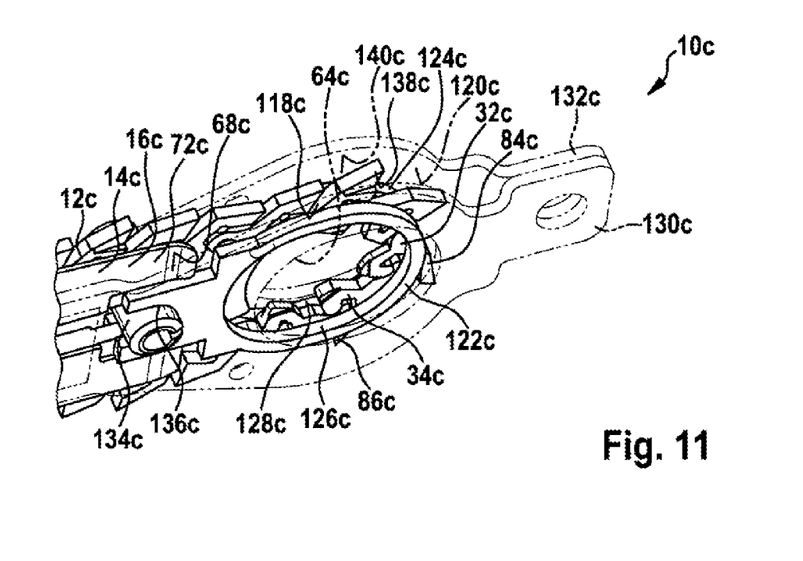
FIG. 11 shows a schematic representation of a further view of a detail of the cutting strand holding unit and FIG. 12 shows a schematic representation of a view of a detail of an alternative development of a cutting strand holding unit of the further alternative machine tool separating device.

FIG. 9 shows a further alternative machine tool separating device 10c when uncoupled from a coupling device of a portable machine tool (not shown here in any detail). The machine tool separating device 10c includes at least one cutting strand 12c and one guide unit 14c which form a closed system. The guide unit 14c, in this connection, includes at least one cutting strand holding unit 116c which has at least two guide faces 118c, 120c which have different alignments with respect to one another and which, when mounted, are provided for guiding the cutting strand 12c (FIG. 11). One of the guide faces 118c, 120c, in this connection, is formed by at least one cutting strand holding element 122c of the cutting strand holding unit 116c. Furthermore, one of the guide faces 118*c*, 120*c* is formed by at least one machine tool coupling element 130*c* of the cutting strand holding unit 116*c*. The guide face 118*c*, which is formed by the cutting strand holding element 122*c*, extends at least substantially at right angles to a cutting plane of the cutting strand 12*c*. In this connection, the guide face 118*c*, formed by the cutting strand holding element 122*c*, is provided for the purpose of preventing, as extensively as possible, the cutting strand 12*c* from falling completely into a coupling recess 64*c* with the guide unit 14*c* removed from the portable machine tool. In this connection, with the guide unit 14*c* removed from the portable machine tool, cutting elements 84*c*, 86*c* of cutting edge carrying elements 32*c*, 34*c* of the cutting strand 12*c* are located with at least one face on the guide face 118*c* (FIG. 10). Placing the faces of the cutting elements 84*c*, 86*c* in position is realized in particular as a result of limiting the cutting elements 84*c*, 86*c* in relation to one another or in relation to a main extension plane of the respective cutting edge carrying element 32*c*, 34*c*.

In addition, the guide unit 14*c* includes at least one guide unit main element 16*c* which has at least two guide faces (not shown here in any detail) which have different alignments with respect to one another and which, when mounted, are provided for guiding the cutting strand 12*c*. Furthermore, the guide unit 14*c* includes a further guide unit main element (not shown here in any detail) which has at least two guide faces (not shown here in any detail) which have different alignments with respect to one another and which, when mounted, are provided for guiding the cutting strand 12*c*. However, it is also conceivable for the guide unit 14*c*, in an alternative development not shown here in any detail, to include two lateral guide walls and one guide means element which is fixedly connected to the two lateral guide walls. In this connection, the two lateral guide walls form in each case a guide face of the guide unit 14*c* which runs at least substantially parallel to an outside face of one of the lateral guide walls. The guide means element, in the alternative development of the guide unit 14*c* not shown here, forms a guide face which runs at least substantially at right angles to the outside face of one of the lateral guide walls.

In addition, the cutting strand holding unit 116*c* is at least in part arranged on the guide unit main element 16*c*. In this connection, the cutting strand holding unit 116*c* is arranged on the guide unit main element 16*c* by means of a friction-locking and/or by means of a positive-bonding connection. However, it is also conceivable for the cutting strand holding unit 116*c* to be arranged on the guide unit main element 16*c* by means of another type of connection which appears sensible to an expert, such as, for example, by means of a positive-locking connection etc. In this connection, the cutting strand holding unit 116*c* is fixed at least in part on an outside wall 72*c* of the guide unit main element 16*c*. Furthermore, the cutting strand holding unit 116*c* is arranged on the further guide unit main element (not shown here in any detail) by means of a friction-locking and/or by means of a positive-bonding connection. In this connection, the cutting strand holding unit 116*c*, when viewed in the cutting plane of the cutting strand 12*c*, extends along at least one direction beyond the guide unit main element 16*c* and the further guide unit main element. In the case of the above-named alternative development of the guide unit 14*c*, it is conceivable for the cutting strand holding unit 116*c* to be arranged on the lateral guide walls by means of a friction-locking and/or by means of a positive-bonding connection and, when viewed in the cutting plane, to extend along at least one direction beyond the lateral guide walls.

The machine tool separating device 10*c* is realized uncoupled from a torque transmitting element. To drive the cutting strand 12*c* which is arranged in the guide unit 14*c*, the cutting strand 12*c*, when the guide unit 14*c* is coupled with the coupling device of the portable machine tool, is coupled with a drive element (not shown here in any detail) of the portable machine tool. The drive element, in this connection, engages in the coupling recess 64*c* of the guide unit 14*c*. The coupling recess 64*c*, in this connection, is formed in part by the machine tool coupling element 130*c* of the cutting strand holding unit 116*c*. Furthermore, the cutting strand holding unit 116*c* has at least the cutting strand holding element 122*c* which has a drive element coupling recess 126*c*. By means of interaction with the coupling recess 64*c* of the machine tool coupling element 130*c*, the drive element coupling recess 126*c* is provided for the purpose of making it possible for the drive element to be coupled with the cutting strand 12*c* with the guide unit 14*c* coupled with the portable machine tool. In this connection, the drive element coupling recess 126*c* is realized in an oval manner. However, it is also conceivable for the drive element coupling recess 126*c* to have another development which appears sensible to an expert. The cutting strand holding element 122*c* is provided for the purpose of holding the cutting strand 12*c* in at least one position. With the guide unit 14*c* uncoupled from the portable machine tool, the cutting strand 12*c* is held in a mounting position by means of the cutting strand holding element 122*c*. In this connection, the cutting strand holding element 122*c* is realized in a disc-shaped manner. In total, the cutting stand holding unit 116*c* has at least two cutting strand holding elements 122*c*, 124*c*. Each of the cutting strand holding elements 122*c*, 124*c* has in each case a drive element coupling recess 126*c*, 128*c*. The at least two cutting strand holding elements 122*c*, 124*c* have an analogous development. However, it is also conceivable for the cutting strand holding elements 122*c*, 124*c* to have developments which deviate at least slightly from one another, such as, for example, a convex development of one of the two cutting strand holding elements 122*c*, 124*c* and a concave development of the other of the two cutting strand holding elements 122*c*, 124*c* or a mirror-symmetrical development, etc. With the guide unit 14*c* uncoupled from the portable machine tool, the cutting strand 12*c* is held in the mounting position by means of interaction between the two cutting strand holding elements 122*c*, 124*c*. In this connection, the cutting elements 84*c*, 86*c* of the cutting edge carrying elements 32*c*, 34*c* of the cutting strand 12*c* abut against guide faces 118*c*, 138*c* of the cutting strand holding elements 122*c*, 124 (FIG. 10).

For coupling the guide unit 14*c* and the cutting strand 12*c* with the portable machine tool, the cutting strand holding unit 116*c* has at least the machine tool coupling element 130*c*. The machine tool coupling element 130*c* is arranged on the outside wall 72*c* of the guide unit main element 16*c*. In this connection, the machine tool coupling element 130*c* is arranged on the outside wall 72*c* of the guide unit main element 16*c* by means of a positive-locking and/or by means of a friction-locking connection. The machine tool coupling element 130*c*, when viewed in the cutting plane of the cutting strand 12*c*, extends along at least one direction beyond the guide unit main element 16*c*. In all, the cutting strand holding unit 116*c* has at least two machine two coupling elements 130*c*, 132*c*. The machine tool coupling elements, in this connection, have an analogous development. Consequently, the machine tool coupling elements 130c, 132c form in each case a guide face 120c, 140c of the cutting strand holding unit 116c which runs at least substantially parallel to the cutting plane of the cutting strand 12c. However, it is also conceivable for the machine tool coupling elements 130c, 132c to have developments which deviate at least slightly from one another, such as, for example, a mirror-symmetrical development, etc. In the case of the above-named alternative development of the guide unit 14c, it is conceivable for the machine tool coupling element or the machine tool coupling elements to be arranged on a lateral guide wall or on one of the lateral guide walls by means of a friction-locking and/or by means of a positive-bonding connection and to extend along at least one direction beyond the lateral guide walls.

The cutting strand holding unit 116c includes at least the cutting strand holding element 122c which, when viewed along a direction which runs at least substantially at right angles to a cutting plane of the cutting strand 12c, is arranged between the at least two machine tool coupling elements 130c, 132c of the cutting strand holding unit 116c (FIG. 11). When viewed along a direction which runs at least substantially at right angles to a cutting plane of the cutting strand 12c, both cutting strand holding elements 122c, 124c are arranged between the at least two machine tool coupling elements 130c, 132c of the cutting strand holding unit 116c. In this connection, the cutting strand holding elements 122c, 124c, when viewed along a direction which runs at least substantially at right angles to a cutting plane of the cutting strand 12c, are arranged spaced apart from one another. As a result, with the guide unit 14c coupled with the portable machine tool, it is possible to engage the drive element of the portable machine tool for driving the cutting strand 12c. The cutting strand holding elements 122c, 124c are held by means of a bolt-shaped fixing element 134c between the machine tool coupling elements 130c, 132c. The fixing element 134c extends in the mounted state at least substantially at right angles to the cutting plane of the cutting strand 12c. Furthermore, the fixing element 134c is arranged in a fixing recess 136c of the respective machine tool coupling elements 130c, 132c. Consequently, the cutting strand holding elements 122c, 124c are fixed at least in relation to the machine tool coupling elements 130c, 132c.

Figure 12:
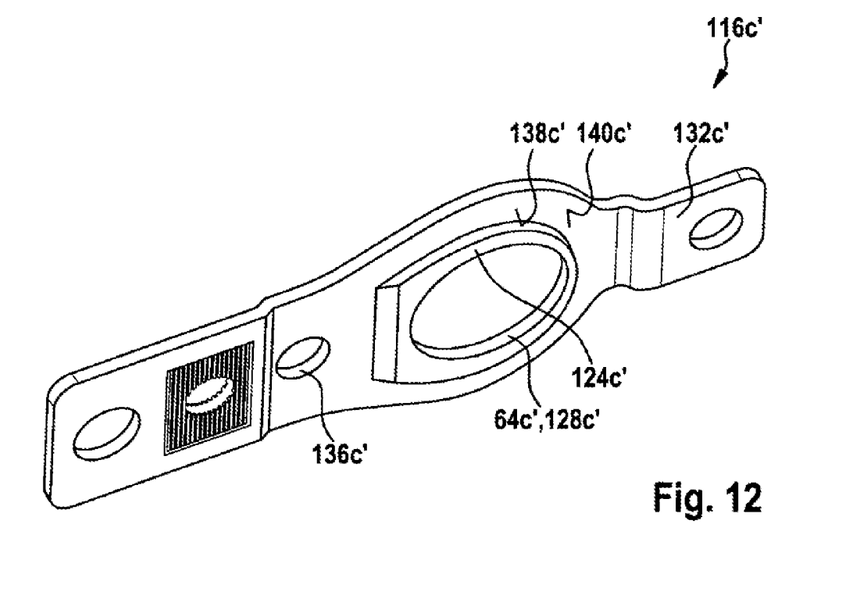

FIG. 12 shows an alternative development of a cutting strand holding unit 116c'. The alternative cutting strand holding unit 116c' has a development which is at least substantially analogous to the cutting strand holding unit 116c from FIGS. 9 to 11. In contrast to the cutting strand holding unit 116c from FIGS. 9 to 11, the cutting strand holding unit 116c' has a machine tool coupling element 132c' which is realized integrally with a cutting strand holding element 124c' of the cutting strand holding unit 116c'. In this connection, a machine tool coupling element (not shown here in any detail) of the cutting strand holding unit 116c' is also realized integrally with a cutting strand holding element (not shown here in any detail) of the cutting strand holding unit 116c'.

The invention claimed is:

1. A machine tool separating device, comprising:
    at least one cutting strand; and
    at least one guide unit including (i) at least one of at least one guide unit main element and at least one cutting strand holding unit and (ii) at least one further guide unit main element releasably connected to the at least one of at least one guide unit main element and at least one cutting strand holding unit,
    wherein the at least one cutting strand and the at least one guide unit define a closed system,
    wherein the at least one of the at least one guide unit main element and the at least one cutting strand holding unit includes at least two guide surfaces having different alignments with respect to one another and which, in a mounted state, are configured to guide the at least one cutting strand, and
    wherein the at least one further guide unit main element includes at least two further guide surfaces having different alignments with respect to one another and which, in a mounted state, are configured to guide the at least one cutting strand.

2. The machine tool separating device as claimed in claim 1, wherein the at least one guide unit main element and the at least one further guide unit main element, in a mounted state, are connected together by at least one of a positive-locking connection and a friction-locking connection.

3. The machine tool separating device as claimed in claim 1, wherein the at least one guide unit, when viewed in a cutting plane of the at least one cutting strand, has at least two convex ends.

4. The machine tool separating device as claimed in claim 1, wherein the at least one cutting strand holding unit is arranged at least in part on the at least one guide unit main element.

5. The machine tool separating device as claimed in claim 1, wherein the at least one cutting strand holding unit includes at least one disc-shaped cutting strand holding element configured to hold the at least one cutting strand in at least one mounting position.

6. The machine tool separating device as claimed in claim 5, wherein the at least one cutting strand holding element includes at least one drive element coupling recess.

7. The machine tool separating device as claimed in claim 1, wherein the at least one cutting strand holding unit includes at least one cutting strand holding element and at least one machine tool coupling element integrally formed with the at least one cutting strand holding element.

8. The machine tool separating device as claimed in claim 1, wherein:
    the at least one cutting strand holding unit includes at least one cutting strand holding element and two machine tool coupling elements, and
    the at least one cutting strand holding element, when viewed along a direction which extends at least substantially at right angles to a cutting plane of the at least one cutting strand, is arranged between the two machine tool coupling elements.

9. The machine tool separating device as claimed in claim 1, wherein:
    the at least one cutting strand includes at least two interconnected cutting edge carrying elements and at least one connecting element, and
    the at least two interconnected cutting edge carrying elements are connected together by the at least one connecting element, which closes off in an at least substantially flush manner with at least one outside surface of one of the at least two cutting edge carrying elements.

10. The machine tool separating device as claimed in claim 9, wherein:
    the at least one guide unit includes a guide element, and
    the at least one connecting element is guided at least in part by the guide element.

11. The machine tool separating device as claimed in claim 1, further comprising a torque transmitting element mounted at least in part in the at least one guide unit.

12. The machine tool separating device as claimed in claim 1, wherein the at least one guide unit, when viewed along a cutting direction of the at least one cutting strand, has a cross section which changes at least in a part region of the at least one guide unit in a direction at least substantially at right angles to a cutting plane of the at least one cutting strand.

13. A portable machine tool, comprising:
a coupling device; and
wherein the coupling device is configured to couple in at least one of a positive-locking coupling and a friction-locking coupling with a machine tool separating device having at least one cutting strand and at least one guide unit, the at least one guide unit including (i) at least one of at least one guide unit main element and at least one cutting strand holding unit and (ii) at least one further guide unit main element releasably connected to the at least one of at least one guide unit main element and at least one cutting strand holding unit, the at least one of the at least one guide unit main element and the at least one cutting strand holding unit including at least two guide surfaces having different alignments with respect to one another and which, in a mounted state, are configured to guide the at least one cutting strand, and the at least one cutting strand and the at least one guide unit defining a closed system, the at least one further guide unit main element including at least two further guide surfaces having different alignments with respect to one another and which, in a mounted state, are configured to guide the at least one cutting strand.

14. A machine tool system, comprising:
at least one machine tool separating device having at least one cutting strand with at least one guide unit including (i) at least one of at least one guide unit main element and at least one cutting strand holding unit and (ii) at least one further guide unit main element releasably connected to the at least one of at least one guide unit main element and at least one cutting strand holding unit, the at least one of the at least one guide unit main element and the at least one cutting strand holding unit including at least two guide surfaces having different alignments with respect to one another and which, in a mounted state, are configured to guide the at least one cutting strand, the at least one further guide unit main element including at least two further guide surfaces having different alignments with respect to one another and which, in a mounted state, are configured to guide the at least one cutting strand, and the at least one cutting strand and the at least one guide unit defining a closed system; and
a portable machine tool having a coupling device configured to couple in at least one of a positive-locking coupling and a friction-locking coupling with the at least one machine tool separating device.

15. The machine tool separating device as claimed in claim 1, wherein the machine tool separating device is configured for use with a hand-held machine tool.

16. The machine tool separating device as claimed in claim 1, wherein the at least one guide unit includes the guide unit main element and the further guide unit main element, the further guide unit element releasably connected to the guide unit main element.

17. The machine tool separating device as claimed in claim 9, wherein the at least one connecting element closes off in a flush manner with the outside surface of the one cutting edge carrying element.

18. The machine tool separating device as claimed in claim 9, wherein:
at least one of the two guide surfaces of the at least one guide unit main element is a lateral guide surface oriented parallel to a cutting plane of the at least one cutting strand, and
the at least one connecting element is guided at least in part by contact with the lateral guide surface.

19. A machine tool separating device, comprising:
at least one cutting strand; and
at least one guide unit including at least one of at least one guide unit main element and at least one cutting strand holding unit,
wherein the at least one cutting strand and the at least one guide unit define a closed system,
wherein the at least one of the at least one guide unit main element and the at least one cutting strand holding unit includes at least two guide surfaces having different alignments with respect to one another and which, in a mounted state, are configured to guide the at least one cutting strand,
wherein the at least one cutting strand includes at least two interconnected cutting edge carrying elements and at least one connecting element,
wherein the at least two interconnected cutting edge carrying elements are connected together by the at least one connecting element, which closes off in an at least substantially flush manner with at least one outside surface of one of the at least two cutting edge carrying elements,
wherein the at least one connecting element is configured integrally with at least one of the at least two interconnected cutting edge carrying elements, and
wherein one or more of (i) the at least one connecting element is configured in a bolt-shaped manner and (ii) the at least two interconnected cutting edge carrying elements are connected directly to each other.

20. The machine tool separating device as claimed in claim 19, wherein:
the at least two interconnected cutting edge carrying elements include a first cutting edge carrying element and a second cutting edge carrying element,
the first cutting edge carrying element includes a first connecting element and a first connecting recess spaced from the first connecting element, and
the second cutting edge carrying element includes a second connecting element and a second connecting recess spaced from the second connecting element, the first connecting element engaged with the second connecting recess to interconnect the first and second cutting edge carrying elements.

* * * * *